UNITED STATES PATENT OFFICE.

GEORGE G. DOWER, OF WORCESTER, MASSACHUSETTS, ASSIGNOR OF ONE-HALF TO GEORGE I. ALDEN, OF WORCESTER, MASSACHUSETTS.

SELF-LUBRICATING METAL BEARING AND THE LIKE.

1,390,197. Specification of Letters Patent. Patented Sept. 6, 1921.

No Drawing. Application filed May 10, 1920. Serial No. 380,107.

*To all whom it may concern:*

Be it known that I, GEORGE G. DOWER, a citizen of the United States, residing at Worcester, in the county of Worcester and State of Massachusetts, have invented a new and useful Self-Lubricating Metal Bearing and the like, of which the following is a specification.

This invention relates to the so-called oilless or self-lubricating metal bearings, bushings and the like in which the lubricant employed consists of solid particles of lubricating material, as graphite, embedded in the metal of which the bearing is made.

The principal objects of this invention are to provide for the production of a bearing or the like or a body of composition suitable for producing a bearing or bushing in which particles of uncoated, untreated, commercially pure graphite will be interspersed throughout the metal with substantial uniformity; to provide a bearing composition which can be made of any bearing metal or alloy, even those having a high melting temperature and without resorting to the use of coating metals, chemicals, fluxes or the like for treating the graphite; to provide one which will present substantially as good a bearing surface after being worn materially and which can be machined easily, and to provide an inexpensive method of manufacture. Further objects and advantages of the invention will appear hereinafter.

The idea of incorporating graphite and other solid lubricants in the metal of which bearings and bushings are made, is very old. It has been proposed to mix the metal and graphite in a solid but comminuted state and consolidate them under pressure, also to introduce flakes of graphite into molten metal and then stir it up so as to distribute them throughout the mass thereof.

One of the improvements which has been introduced in this class of bearings has been the coating of the graphite particles with copper before mixing them in the molten bearing metal. This was limited to the use of bearing metals which would melt at a temperature below that of the copper for otherwise the copper would melt and thus free the particles of graphite. It is also objectionable because it impairs the value of the metal bearing itself owing to the presence of two metals of different properties and involves what I find to be entirely unnecessary expense. Traces of the acids employed in precipitating the copper also are left in the bearing metal causing damage thereto. It is not possible to machine such bearings by any ordinary methods.

The necessity for the above mentioned inventions lay in the fact that graphite is lighter than any practical bearing metal or alloy and would float to the top of the same when in fluid condition. I have found that I can produce a self-lubricating bearing which can be made of any suitable metal or alloy, even iron, and commercially pure graphite without danger of the graphite rising to the top of the casting.

My preferred method of procedure is as follows:—The metal or alloy, whether it is soft or hard, is divided up into small particles and mixed with commercially pure uncoated free graphite, in the usual fine flake form for example. An intimate mixture is formed in which the graphite is interspersed uniformly throughout the metal, or in other words is located in the metal in substantially the way in which it is desired to have it in the finished article. Then the mixture is subjected to pressure preferably in a mold shaped to produce the article desired. This consolidates the metal and graphite somewhat. The pressure may run as high as from one hundred to one thousand pounds per square inch but I do not wish to be limited to any specified amount. Then the mixture is heated until the metal fuses, still under pressure, and then immediately cooled to cause it to set in the mold before the graphite can rise in the mold and gather about the upper surfaces thereof. In other words I introduce into a mold the graphite and bearing metal or alloy, both in comminuted form and thoroughly mixed, in a solid or unmelted state, subject it to pressure, melt the metal and then cool it before the graphite segregates. The metal can be reduced to this fine condition by granulating or otherwise. The proportions and amount of graphite can be varied within wide limits, but I usually prefer to have the graphite constitute substantially from 5% to 50% of the whole mixture by volume.

The process is very short and inexpensive and the cost of the bearing is reduced over those produced by processes recently introduced because it eliminates all preliminary treatment of the graphite. It permits of the use of metals or alloys having a high melting point, such as bronze and even cast iron, which it may be desirable to use for special purposes. The invention is capable of universal application for all bearing metals.

A uniform distribution of the graphite in the metal is secured and the metal is substantially free from cavities and blow holes. The product is formed of pure materials, the graphite especially being in its commercially pure form without treatment by acids or prior coating with metal, in fact it can be, and preferably is, used in the flake form in which it is obtainable on the market. The product can be machined or worn down without damage to it and especially without causing a variation in the amount of graphite appearing in the surface. During the process, there is no acid used which can render its surfaces brittle and thus impair the wearing surface of the bearing or render the machining of its surfaces practically impossible.

Although I have specified a single series of steps in carrying out the process, I am aware of the fact that modifications can be made therein by any person skilled in the art without departing from the scope of the invention as expressed in the claims. Therefore, I do not wish to be limited in these respects, but what I do claim is:

An oilless bearing formed from bearing metal, and commercially pure graphite, mixed together while both are solid and in a fine state of subdivision and free from all foreign materials, the metal having been melted under pressure and cooled quickly, whereby the graphite particles are imprisoned therein while they are substantially in the position occupied by them before melting the metal.

In testimony whereof I have hereunto affixed my signature.

GEORGE G. DOWER.